United States Patent
Dash et al.

(10) Patent No.: US 9,645,859 B1
(45) Date of Patent: May 9, 2017

(54) PERFORMING I/O QUIESCE AND DRAIN OPERATIONS IN MULTI-NODE DISTRIBUTED SYSTEMS

(71) Applicant: Veritas Technologies LLC, Mountain View, CA (US)

(72) Inventors: Prasanta R. Dash, San Jose, CA (US); Amarinder Singh Randhawa, Sunnyvale, CA (US); Asmita Jagtap, Pune Maharastra (IN); Chaitanya Yalamanchili, Sunnyvale, CA (US); Madhav Buddhi, Sunnyvale, CA (US)

(73) Assignee: Veritas Technologies LLC, Mountain View, CA (US)

( * ) Notice: Subject to any disclaimer, the term of this patent is extended or adjusted under 35 U.S.C. 154(b) by 752 days.

(21) Appl. No.: 13/718,740

(22) Filed: Dec. 18, 2012

(51) Int. Cl.
*G06F 3/00* (2006.01)
*G06F 9/52* (2006.01)

(52) U.S. Cl.
CPC . *G06F 9/52* (2013.01); *G06F 3/00* (2013.01)

(58) Field of Classification Search
USPC ......... 710/28, 32, 36, 39, 40, 310, 240, 244; 711/147, 148, 150–152, 162
See application file for complete search history.

(56) References Cited

U.S. PATENT DOCUMENTS

| | | | |
|---|---|---|---|
| 6,173,374 B1 * | 1/2001 | Heil et al. | 711/148 |
| 6,647,514 B1 * | 11/2003 | Umberger et al. | 714/42 |
| 6,728,849 B2 * | 4/2004 | Kodama | 711/162 |
| 6,976,186 B1 * | 12/2005 | Gardner | 714/4.4 |
| 2002/0138670 A1 * | 9/2002 | Johnson | 710/6 |
| 2007/0192526 A1 * | 8/2007 | Sharma et al. | 710/311 |
| 2010/0082921 A1 * | 4/2010 | Thompson et al. | 711/162 |
| 2012/0144233 A1 * | 6/2012 | Griffith et al. | 714/13 |
| 2013/0067161 A1 * | 3/2013 | Chandra et al. | 711/114 |
| 2013/0132766 A1 * | 5/2013 | Bhatia et al. | 714/5.11 |

* cited by examiner

*Primary Examiner* — Khanh Dang
(74) *Attorney, Agent, or Firm* — Campbell Stephenson LLP

(57) ABSTRACT

Various systems and methods for performing Input/Output (I/O) quiesce and drain operations in multi-node distributed storage systems are disclosed. For example, one method involves receiving a message. The message indicates a request for a operation to be performed by a node, where the node can receive I/O requests from an application, as well as remote I/O requests from another node. The node can issue the I/O requests and the remote I/O requests to the one or more storage devices. In response to receipt of the message, the method performs a first portion of a operation on the node. The first portion of the operation includes the node not processing any additional locally generated I/O requests and processing additional remote I/O requests.

21 Claims, 10 Drawing Sheets

PERFORMING I/O QUIESCE AND DRAIN OPERATIONS IN MULTI-NODE DISTRIBUTED SYSTEMS

BACKGROUND OF THE INVENTION

Field of the Invention

This application relates to distributed storage systems. Particularly, this application relates to performing Input/Output (I/O) quiesce and drain operations in multi-node distributed storage systems.

Description of the Related Art

As businesses increasingly rely on computers for their daily operations, managing the vast amount of business information generated and processed has become a significant challenge. Most large businesses have a wide variety of application programs managing large volumes of data stored on many different types of storage devices across various types of networks and operating system platforms. These storage devices can include tapes, disks, optical disks, and other types of storage devices and often include a variety of products that can be produced by different vendors. Storage area networks (SANs) including hundreds of storage devices can be used to provide storage for hosts.

SANs offer a variety of topologies and capabilities for interconnecting storage devices, subsystems, and server systems. A variety of interconnect entities, such as switches, hubs, and bridges, can be used to interconnect these components. These varying topologies and capabilities allow storage area networks to be designed and implemented that range from simple to complex configurations. Accompanying this flexibility, however, is the complexity of managing a very large number of devices and allocating storage for numerous application programs sharing these storage devices.

BRIEF DESCRIPTION OF THE DRAWINGS

The embodiments of the present application may be better understood, and its numerous objects, features, and advantages made apparent to those skilled in the art by referencing the accompanying drawings.

Figure 1:
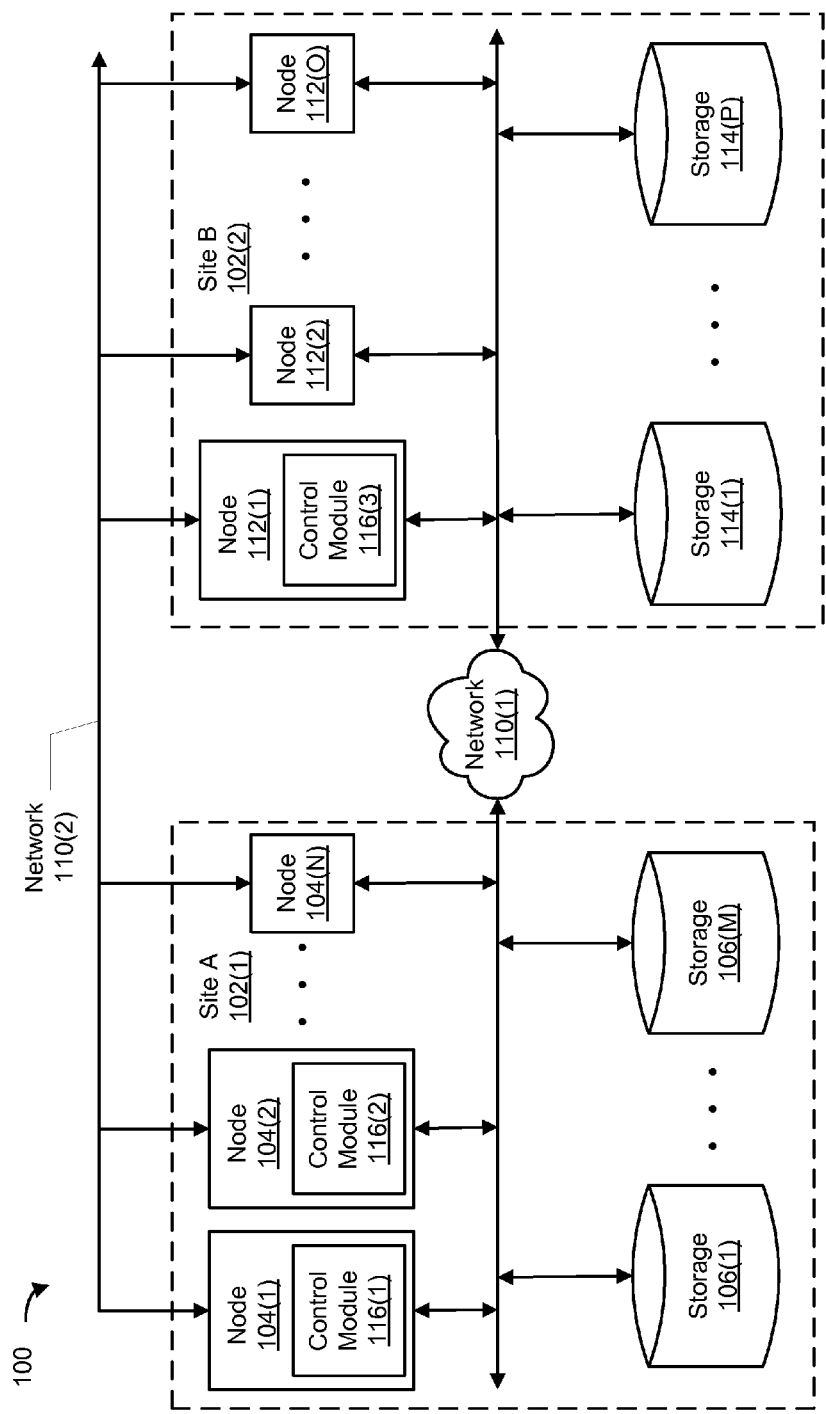
FIG. 1 is a block diagram illustrating a distributed storage system, according to one embodiment.

While the embodiments of the application are susceptible to various modifications and alternative forms, specific embodiments are provided as examples in the drawings and detailed description. It should be understood that the drawings and detailed description are not intended to limit the embodiments to the particular form disclosed. Instead, the intention is to cover all modifications, equivalents and alternatives falling within the spirit and scope of the invention as defined by the appended claims.

DETAILED DESCRIPTION

Embodiments of the present application are directed to managing Input/Output (I/O) quiesce and drain operations of a distributed storage system (such as shown in FIG. 1). The distributed storage system can include multiple sites, and it can implement any one (or more) of a variety of storage access, backup, archiving, and/or redundancy operations, among others. The multiple sites can be connected together, such as using a network. Each site can include one or more nodes that form a communication cluster. One or more of these nodes includes a control module that can manage these data operations. The nodes (e.g., application(s) executing on or coupled to these nodes) issue input/output (I/O) requests (e.g., data reads, data writes, etc.) to access storage device(s). Some of the I/O requests are issued directly by each node, such as to access the storage devices (also referred to herein as local I/O). Some of the I/O requests are issued indirectly, such as by using another node as a proxy. The process of issuing I/O requests using a proxy node is referred to herein as I/O shipping. A proxy node receives I/O requests from a node. The I/O requests that are being sent (e.g., in transit) from a node to a proxy node are referred to as in-flight I/O or shipped I/O. Once any in-flight I/O is received by a proxy node, the in-flight I/O is referred to herein as remote I/O. The proxy node would then issue these remote I/O requests to the storage device(s).

The control module can also direct the nodes to perform I/O quiesce and/or drain operations. Typically, a node receives and processes I/O requests from applications and/or other nodes. An I/O quiesce operation typically directs a node to stop processing of I/O requests, after which any I/O requests that are received by each node are typically stored (and queued for later processing). I/O quiesce operations can be performed cluster-wide (i.e., referred to herein as cluster-wide I/O quiesce operations). A node, such as a supervising node, can indicate cluster-wide I/O quiesce (i.e., a cluster-wide I/O quiesce state) once each node in the cluster has indicated completion of I/O quiesce operation on that node.

A drain operation directs the node to wait for completion of any I/O requests that are pending and/or being processed. I/O drain operations can be performed cluster-wide (i.e., referred to as cluster-wide I/O drain operations). A node, such as a control node, can indicate cluster-wide I/O drain once each node in the cluster has indicated completion of I/O drain on that node.

However, when I/O shipping is used, situations can occur in which a node does not complete quiesce/drain operations by itself (i.e., without using other node(s)). Typically, a node that ships I/O (referred to herein as a shipping node) to another node indicates that the shipped I/O is completed once the proxy node confirms successful issuance (i.e., issuance to the storage device(s) and confirmation of completion by the storage device(s)) of that shipped I/O request(s) to the storage devices. However, the proxy node may be able to complete quiesce operation before the shipping node. In this case, the proxy node would not complete these shipped I/O requests since the proxy node is already in the quiesce state. The shipping node would then not receive acknowledgement(s) of the shipped I/O being completed, and therefore the shipping node would not be able to enter into the I/O drained state. As a result, cluster-wide quiesce (and/or drain) state would not be achieved, either, since all nodes in the cluster cannot complete quiesce/drain operations. However, by allowing proxy node(s) to continue to receive and/or issue shipped I/O while undergoing quiesce/drain operations, these types of timing issues are eliminated, thus enabling the shipping nodes to enter quiesce and drained states, and also enabling cluster-wide quiesce and drain states.

Each shipping node follows the typical quiesce/drain operation, except that the I/O is shipped to proxy nodes instead of to storage devices. Each proxy node will continue to receive and process shipped I/O requests, even after that proxy node indicates local quiesce/drain state. Eventually, the shipping nodes will be in local quiesce/drained state, and thus will indicate such local quiesce/drain states and/or discontinue shipping additional I/O to the proxy nodes. Once the proxy nodes and shipping nodes indicate local quiesce/drain state, the control/supervising module will indicate a cluster-wide quiesce/drain state. Since the shipping nodes will not acknowledge local drain until the shipped I/O is processed by the proxy nodes, the cluster-wide drain indication accurately indicates the state of the cluster with respect to any I/O requests.

FIG. 1 is a block diagram illustrating a distributed storage system 100 that includes a collection of nodes and storage. System 100 includes two sites, site A 102(1) and site B 102(2), although distributed storage system 100 can be easily expanded to have additional or fewer sites, as desired. Site A 102(1) includes nodes 104(1)-104(N), and site B 102(2) includes nodes 112(1)-112(N). Each of nodes 104(1)-104(N) and/or 112(1)-112(N) can be accessed by clients (not shown), such as over network 110(2). Each network 110(1)-110(2) can also include one or more routers, hubs, and/or other network elements (not shown), as desired.

A collection of nodes form a cluster and communicate to one or more storage devices. Nodes 104(1)-104(N) access storage devices 106(1)-106(M) of the same site (site A 102(1)) and/or storage devices 114(1)-114(P) of another site (site B 102(2)). Similarly, nodes 112(1)-112(O) access storage devices 114(1)-114(P) of the same site (site B 102(2)) and/or storage devices 106(1)-106(M) of another site (site A 102(1)). Nodes 104(1)-104(N)/112(1)-112(O) access storage devices 106(1)-106(M)/114(1)-114(P) to perform various data operations, such as to read, write, backup, and/or archive data, among others. Nodes 104(1)-104(N) include one or more control modules, such as control modules 116(1) and 116(2). Similarly, nodes 112(1)-112(O) include one or more control modules, such as control module 116(3). Each such control module can manage operation of node(s), such as nodes of the same cluster or site.

A node accesses storage device(s) by issuing input/output (I/O) requests. For example, nodes can execute parallel applications. Each instance of such parallel application can issue I/O requests to the same storage device(s). The instances of parallel applications typically coordinate write I/O accesses to the same storage device(s), such that data consistency is maintained. These I/O requests can thus be issued by each such application, which is also referred to herein as being issued by each node (such as if each node executes an instance of a parallel application). Some I/O requests may be internally generated as a result of application I/O (logs, COW snapshots, metadata/attribute etc) or due to other operations (compression, de-duplication, backup etc.). The I/O requests can be issued directly from each node (also referred to as local I/O) to the storage devices, and/or indirectly (also referred to as remote I/O or shipped I/O), such as by using another node as a proxy.

The node acting as a proxy (also referred to herein as a proxy node) evaluates these remote I/Os and communicates these to the storage device(s). In some embodiments, a proxy node acts as an intermediary for I/O requests issued by an originating node. The originating node (e.g., an instance of a parallel application) sends the remote I/O requests to the proxy node for a variety of reasons, such as if the originating node does not have direct access to the storage devices. The proxy node can coordinate issuance of I/O requests from remote node(s), as well as local I/O requests, to the storage device(s), etc. The proxy node would then process (e.g. issue) the remote I/O requests to the storage devices.

For example, nodes 104(1)-104(N) accesses storage devices 106(1)-106(M). Node 104(2) can use node 104(1) as a proxy, meaning that node 104(2) (e.g., an instance of an application on node 104(2)) issues I/O requests (i.e., remote I/O requests for accessing storage devices 106(1)-106(M)) to node 104(1). Node 104(2) can issue such remote I/O requests if, for example, node 104(2) loses connectivity to the storage devices. Node 104(1) issues these remote I/O requests, as well as locally generated (e.g., by a local instance of an application) I/O requests, to storage devices 106(1)-106(M).

Storage devices 106 and/or storage devices 114 can be accessed as a shared storage device, such as a cluster shared volume. For example, storage devices 106(1)-106(M) can be implemented as a collection of hard disk drives aggregated to form at least one volume accessible for read and write operations by nodes 104(1)-104(N) and 112(1)-112(O). According to some embodiments, storage devices 106 and/or storage devices 114 can be formatted using a virtual machine file system (VMFS), or a similar file system that can be used by multiple virtual machines. Virtual machines can perform I/O reads and writes to storage devices 106 and/or storage devices 114, such as to read and write data.

Nodes of site B 102(2) can be used for providing data protection and/or back-up for applications and/or virtual machines of site A 102(1), i.e., by using any one of various data protection/back-up techniques. Typically, each node 104(1)-104(N) and/or 112(1)-112(O) can be implemented using a server, including one or more processors, memory, bus, etc. One example implementation of such a server is described below with reference to FIG. 8. Network 110(1)-110(2) can be implemented as any one or more wired and/or wireless networks, including any combination of a local area network (LAN), and/or a storage area network (SAN), etc.

In some embodiments, to implement cluster wide I/O quiesce, control module 116(1) can send a quiesce message to a given set of nodes (e.g., nodes 104(1)-104(N) of a cluster). It is noted that control module 116(1) can use another technique in addition to, or instead of, sending messages, to notify the nodes of the desired quiesce (and/or drain), such as by issuing notifications, raising interrupts, setting shared register bits, writing quiesce (and/or drain) instructions in shared memory, among others, and unless otherwise indicated, using messages also encompasses these other techniques. Furthermore, control module 116(1) can issue such message to only a subset of the cluster, e.g., nodes 104(1) and 104(2) only. This message can indicate to each node to quiesce I/O requests. This quiesce request ensures that any further I/O requests are not serviced by the nodes, and should be stored instead (e.g., queued). Similarly, to implement cluster wide I/O drain, control module 116(1) can send a drain message to select nodes (e.g., nodes 104(1)-104(N) of a cluster).

In some embodiments, control module 116(1) can send a quiesce and drain (Q&D) message to select nodes, e.g., all nodes of a cluster. Typically, to achieve cluster-wide Q&D, I/O requests are first quiesced on all nodes, and then drained on all nodes. The control node sends the messages to all the nodes, and collects and aggregates the responses from the nodes to determine if cluster wide quiesce/drain state(s) have been achieved.

Figure 2:
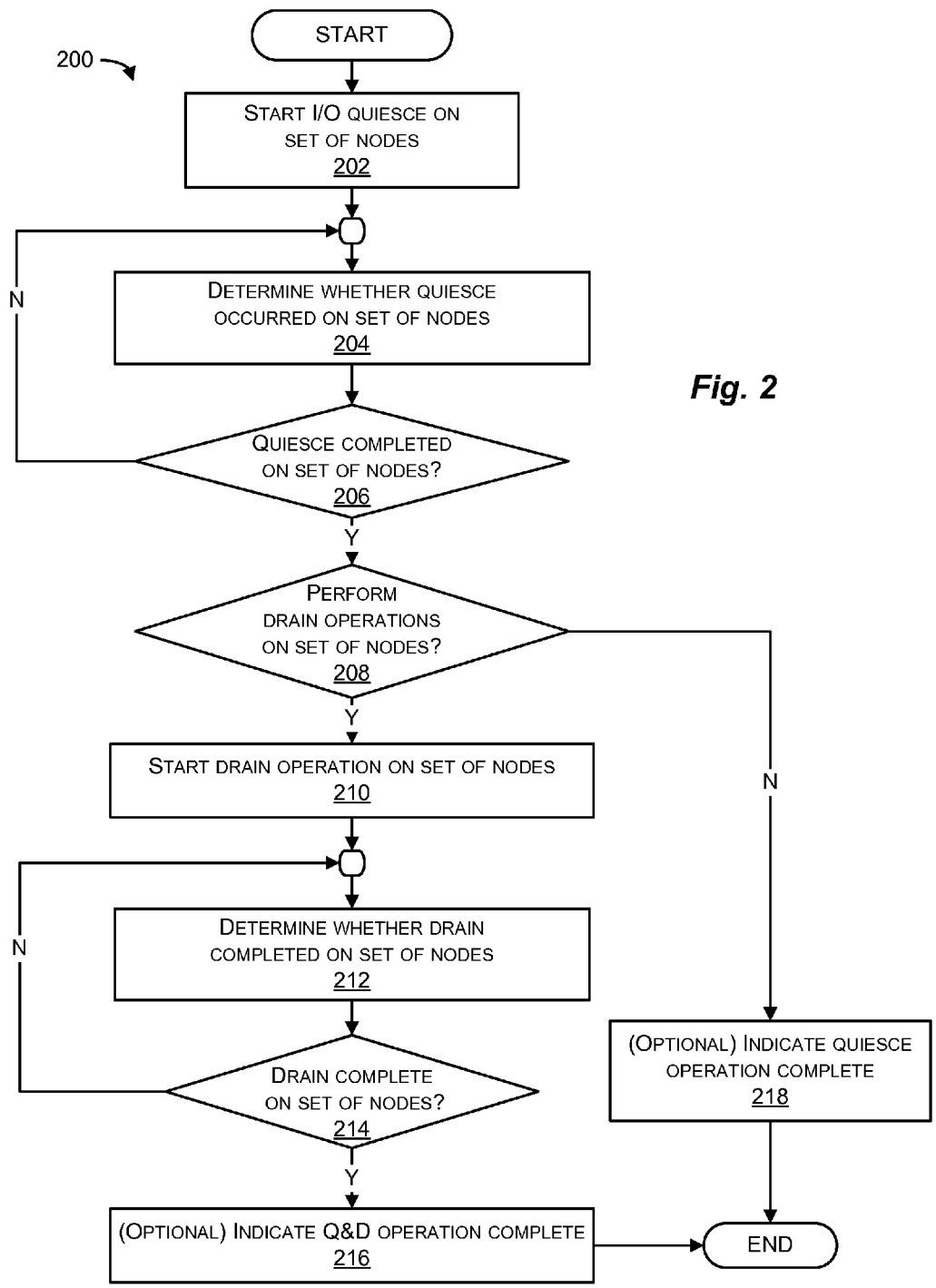
FIG. 2 is a flowchart of a method illustrating operation of I/O quiesce and drain operations in multi-node distributed storage systems, according to some embodiments.

FIG. 2 illustrates a method 200 for performing Input/Output (I/O) quiesce and drain operations in multi-node distributed storage systems, according to some embodiments. As will be appreciated in light of the present disclosure, this method may be modified in order to derive alternative embodiments. Also, some operations in this embodiment are shown in sequential order. However, certain operations may occur in a different order than shown, certain operations may be performed concurrently, certain operations may be combined with other operations, and certain operations may be absent in another embodiment. Method 200 is described with reference to variations of the elements described in connection with FIG. 1. In one embodiment, at least portions of method 200 are executed by the nodes of FIG. 1, such as by control module 116(1).

In element 202, I/O quiesce operation is started on a set of nodes, according to one embodiment. The I/O quiesce operation can be started, for example, by the control node issuing quiesce message(s)/notifications to select nodes of a cluster. The selected nodes can be a subset of a cluster, as determined by the control module. When only selected nodes of a cluster are used, the non-selected nodes do not perform the quiesce/drain operations. In one embodiment, the control node only starts the quiesce/drain operations on shipping nodes, i.e., nodes that originate shipped I/O. By performing the quiesce/drain operations only on shipping nodes, I/O shipping can be disabled. It is noted that during execution of method 200, instances of applications (such as of parallel applications) issue I/O requests to access the storage devices. Some nodes (e.g., application instances) issue in-flight I/O requests to proxy node(s). These I/O requests are processed (e.g., stored and issued) by the nodes.

In element 204, the control module determines whether the quiesce operation is completed by the set of nodes, according to one or more embodiments. The control module can make this determination based on indications/notifications received from other nodes, e.g., the set of nodes of element 202. In element 206, if the control module determines that quiesce operation is completed by the set of nodes, element 208 is performed. Otherwise, element 204 is performed. As described herein, each of the set of nodes can continue to receive and process shipped I/O after indicating that quiesce operation is completed.

In element 208, the control module and/or the set of nodes determine whether a drain operation should also be performed. If the control module/set of nodes determine that the drain operation should also be performed, element 210 is performed. Otherwise, element 218 is performed. It is noted that in some embodiments, the messages/indications mentioned in element 202 indicate that quiesce and drain operations should be performed by the set of nodes. However, in another embodiment, the control node can send separate messages/indications (e.g., to each node) for each of quiesce and drain operations.

In element 210, I/O drain operation is started on a set of nodes, according to one embodiment. The drain operation can be started, for example, by the control node issuing drain message(s)/notifications to the select nodes of a cluster. As noted, the I/O drain operation can be started by each node automatically, i.e., in response to that node completing the quiesce operation.

In element 212, the control module determines whether the drain operation is completed by the set of nodes, according to one or more embodiments. The control module can make this determination based on indications/notifications received from other nodes, e.g., the set of nodes of element 202. In element 214, if the control module determines that drain is completed by the set of nodes, element 216 can be performed. Otherwise, element 212 is performed. As described herein, each of the set of nodes can continue to receive shipped I/O after indicating that drain is completed. In element 216, the control module can optionally indicate that the quiesce and drain operation is completed by the set of nodes. For example, the control module can indicate cluster-wide quiesce and drain state. In element 218, the control module can optionally indicate that the quiesce operation is completed by the set of nodes. For example, the control module can indicate cluster-wide quiesce.

Figure 3:
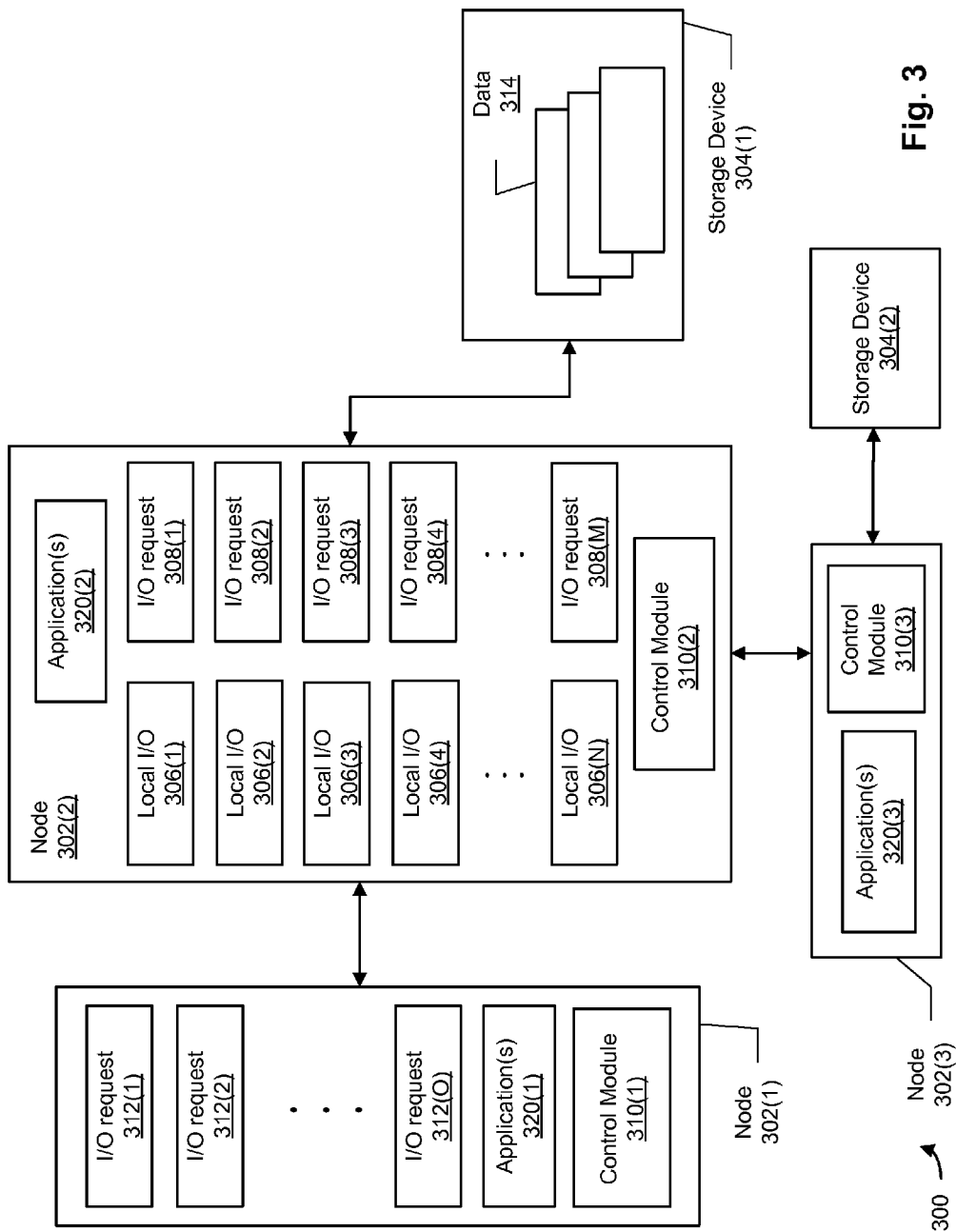
FIG. 3 is a block diagram illustrating various nodes and storage device of a distributed storage system, according to some embodiments.

FIG. 3 is a block diagram 300 illustrating various nodes and storage device of a distributed storage system, according to some embodiments. FIG. 3 illustrates a distributed storage system with nodes 302(1)-302(3) and storage devices 304(1) and 304(2). It is noted that the distributed storage system can include additional nodes and/or storage devices, and FIG. 3 is shown for explanatory purposes only. Each of nodes 302(1)-302(3) can include one or more processors, communication element(s), and memory. As described above with reference to FIG. 4, memory of at least one of the nodes can implement at least a portion of a control module, such as control module 310(1)-310(3), which is executable by processor(s). FIG. 3 illustrates connectivity between node 302(2) and nodes 302(1) and 302(3). It is noted that this connectivity is exemplary only, and each of these nodes can be additionally connected, such as by using redundant networks, e.g., as shown by network 110(2) of FIG. 1, among others. It is noted that storage devices 304(1) and 304(2) can represent a disk group, and as such, can include multiple physical enclosures each containing multiple disks. In a communication cluster that includes nodes 302(1)-302(3), each node can access at least a portion of storage devices 304(2) and 304(2).

Node 302(1) includes a control module 302(1) and one or more applications 320(1). Application(s) 320(1) generate multiple I/O requests, such as I/O requests 312(1)-312(O). In one implementation, one or more of I/O requests 312(1)-312(O) are communicated to node 302(2) as in-flight I/O requests. Node 302(1) may not have direct connectivity/communication with storage device 304(1). Instead, node 302(1) communicates the in-flight I/O requests to node 302(2), i.e., to use node 302(2) as a proxy node. As a result, node 302(1) acts as a shipping node. Node 302(2) would then issue these remote I/O requests (i.e., received in-flight I/O) to storage device(s), i.e., storage device 304(1). Upon receiving an indication to start I/O quiesce/drain operation, control module 310(1) can start the quiesce/drain operation, such as described with reference to FIG. 8. At some point of the quiesce/drain operation, control module 310(1) can store I/O requests (i.e., a portion of I/O requests 312(1)-312(O)) that are generated by application 320(1) after receiving this indication. As part of the quiesce operation, control module 310(1) determines (e.g., by waiting on confirmation(s)) whether the shipped I/O were successfully issued by proxy node(s).

Node 302(2) includes a control module 310(2) and one or more applications 320(2). Similarly, node 302(3) includes a control module 310(3) and one or more applications 320(3). Application(s) 320(2) generate multiple I/O requests, such as I/O requests 306(1)-306(N), which can be referred to as local I/O requests. Node 302(2) can also receive various in-flight I/O requests (also referred to as shipped I/O) from one or more nodes, e.g., from node 302(1) and/or node 302(3), such as generated by respective applications 320(1) and/or 320(3). These in-flight I/O requests can be stored by node 302(2), e.g., as remote I/O requests 308(1)-308(M). Node 302(2) can issue, such as by using control module 310, both local I/O and remote I/O requests. When issuing remote I/O requests to storage device 304(1), node 302(2) acts as a proxy node for node 302(1) that originally issued these remote I/O requests. Once the storage devices receive the issued I/O requests, the storage devices process these I/O requests and send back confirmations, as appropriate. Upon receipt of these confirmations from the storage device, node 302(2) can communicate these confirmations to the shipping node, i.e., node 302(1).

Upon receiving an indication to start I/O quiesce/drain operation, control module 310(2) can start the quiesce/drain operation, such as described with reference to FIG. 5. At some point of the quiesce/drain operation, control module 310(2) can store I/O requests (i.e., a portion of I/O requests 306(1)-306(O)) that are generated by application 320(2) after receiving this indication. However, during the quiesce/drain operation, control module 310(2) continues to receive and/or process shipped I/O.

In one embodiment, storage device 304 stores data 314. Once the storage devices receive the issued I/O requests, the storage devices process these I/O requests. The storage devices typically send confirmation(s) back to the issuing node for indicating status of the issued I/O requests. In case of remote I/O being issued by the proxy node, storage device 304(1) can send confirmation back to node 302(2) indicating successful completion of remote I/O request (e.g., I/O requests 308(1)-308(4)).

Figure 4:
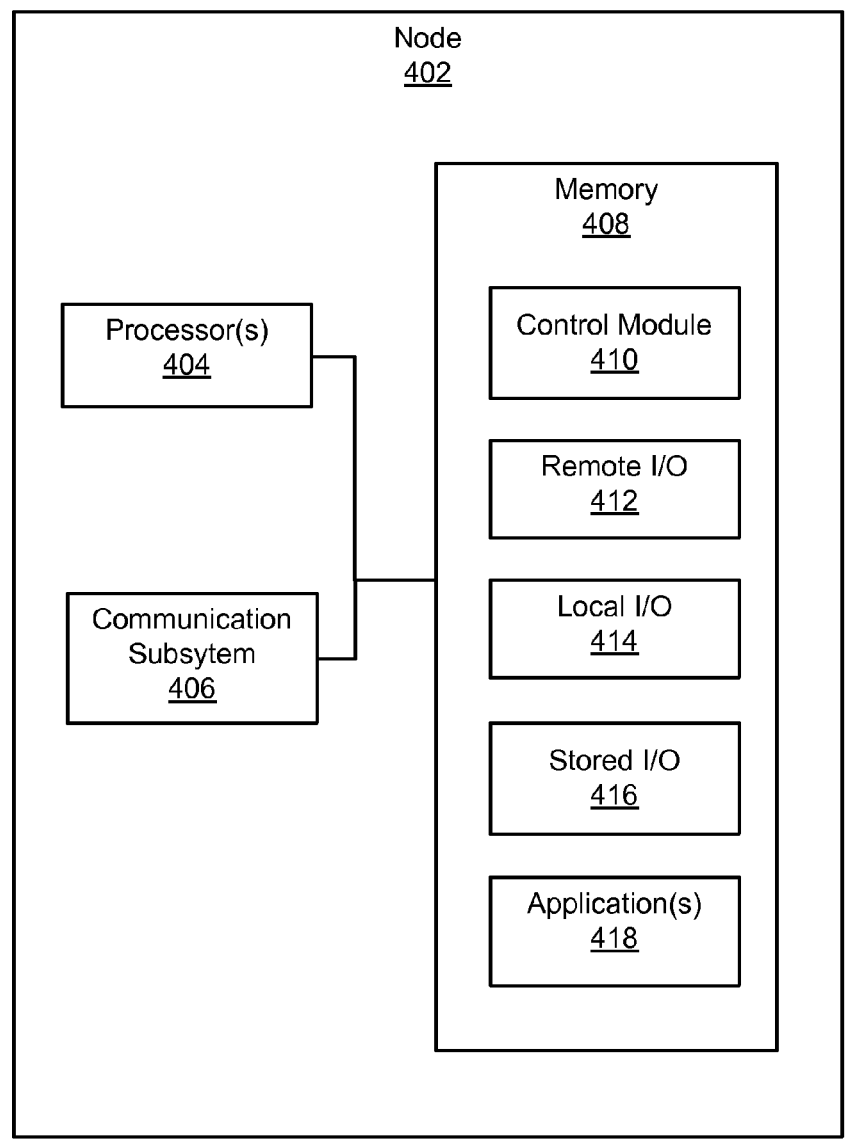
FIG. 4 is a block diagram illustrating an example node of a distributed storage system, according to one embodiment.

FIG. 4 is a block diagram 400 illustrating an example node of a distributed storage system, according to one embodiment. Node 402, which can implement node 104(1)-104(N), node 112(1)-112(N), and/or node 302(1)-302(3), includes a processor 404, communication subsystem 406, and a memory 408. Memory 408 includes an operating system (not shown), control module 410, remote I/O 412, local I/O 414, stored I/O 410, and one or more applications 418. It is noted that one or more of element(s) of control module 410 can be implemented as software, hardware module(s), or some combination thereof. It is also noted that in some embodiments one or more of elements of node 402 may not be used. Processor(s) 404 executes one or more elements of control module 810. Control module 810 can be an implementation of control module 116, control module 310(1)-310(3), and/or control module 352, and can implement at least portions of methods 200, 500, 600, 700, and/or 800. Remote I/O can implement I/O requests that are received by a proxy node from another node, such as I/O requests 308(1)-308(M) received from node 302(1). Local I/O can implement I/O requests that are generated and then issued by the same node, such as I/O requests 306(1)-306(N) generated by node 302(2). Stored I/O can implement I/O requests that are stored (e.g., queued) after receiving indication(s) of start of a quiesce/drain operation. In some embodiments, the stored I/O includes local I/O that is queued, but does not include shipped I/O. Application(s) 416 can be instance(s) of parallel applications executed by nodes.

Figure 5:
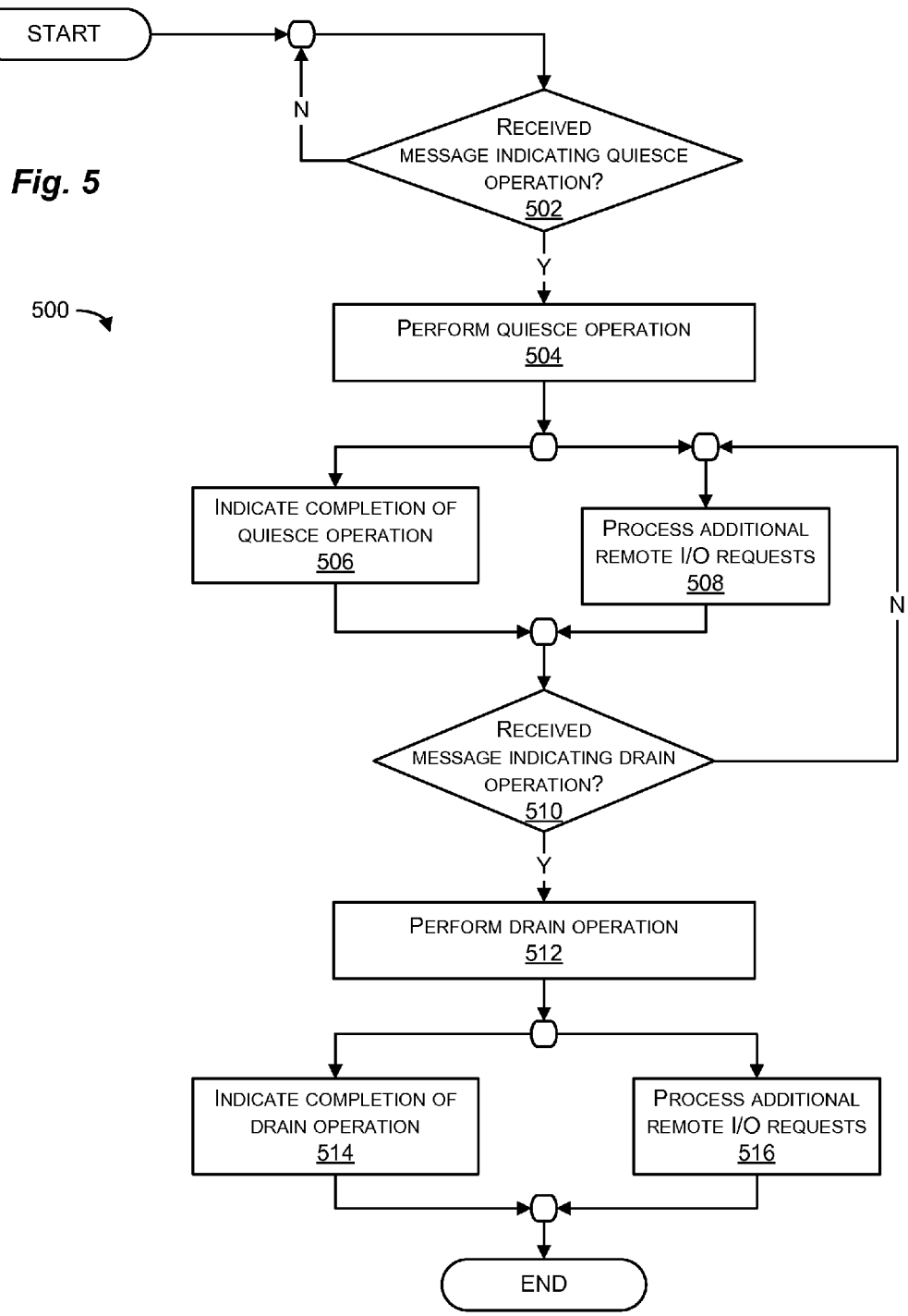
FIG. 5 is a flowchart of a method illustrating operation of a proxy node of a distributed storage system performing I/O quiesce and drain operations, according to some embodiments.

FIG. 5 is a flowchart of a method 500 illustrating operation of a proxy node of a distributed storage system performing I/O quiesce and drain operations, according to some embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 500 is described with reference to variations of the elements described in connection with FIGS. 1, 2, and 3. In one embodiment, method 500 is executed by a control module, such as control module 116 and/or control module 310(1)-310(3). In one embodiment, method 500 is implemented by a proxy node, such as node 302(2).

In element 502, the control module determines whether a message indicating start of a quiesce operation is received, according to one embodiment. It is noted that this message (i.e., received by the control module) can also indicate a drain operation, i.e., the message indicates a quiesce and drain operation. A supervising control module/manager entity can send these messages to various of the nodes' control modules. As noted above, another technique to notify control modules of a quiesce (and/or drain) operation(s) can be used in addition to, or instead of, sending messages, such as by issuing notifications, raising interrupts, setting shared register bits, writing quiesce (and/or drain) instructions in shared memory, among others, and unless otherwise indicated, using messages also encompasses these other techniques. If the control module determines that the quiesce start message is received, element 504 is performed. Otherwise, the process loops, and element 502 is performed again.

In element 504, the control module starts I/O quiesce operation on the associated proxy node, according to one embodiment. With reference to FIG. 3, in response to receiving the quiesce message of element 502, control module 310(2) starts the quiesce operation on its associated node 302(2). The quiesce operation includes the proxy node stopping acceptance of any new I/O requests (except as determined to be dependent I/O, as described below) that are locally generated by the local application, e.g., application 320(2). Since the local application typically continues to generate I/O requests, these local I/O requests are stored, such as by using a queue. The quiesce operation also includes the proxy node continuing to accept any new shipped I/O, i.e., I/O requests that are received from shipping nodes, such as node 302(1) (and generated by application 320(1)).

In element 506, the control module indicates completion of the quiesce operation. For example, control module 310(2) can send a message/indication to a supervising control module/manager entity (e.g., control module 310(3) of node 302(3)). However, in some implementation, the control module of the proxy node can simply internally indicate completion of the quiesce operation. In one example, when performing a quiesce/drain operation, the drain portion of the operation is not performed until the quiesce portion of the operation is completed first.

In element 508, the control module continues to process additional remote I/O requests, according to one embodiment. With reference to FIG. 3, control module 310(2) of proxy node 302(2) continues to receive, and process (i.e., issue to storage device 304(1) and send success confirmations from the storage devices to the shipping node(s)) remote I/O received from shipping node 302(1). The control module of the proxy node continues to store (e.g., queue) local I/O requests.

In element 510, the control module determines whether a message indicating start of a drain operation is received, according to one embodiment. It is noted that this drain operation indicating message can be a new message that is received from the supervising module. In one implementation, an indication to start the drain operation can be included in the message received in element 502. In other words, the I/O drain operation can be started by the control module receiving drain message(s)/notifications. The I/O drain can also be started by the control module automatically, i.e., in response to the node completing I/O quiesce, (e.g., indication of start of the drain operation is implied). Also, element 510 is not performed until quiesce operation is completed and this quiesce completion indicated. If the control module determines that the drain start message is received, element 512 is performed. Otherwise, element 508 is performed.

In element 512, the control module performs the drain operation. The drain operation includes the proxy node issuing the local and remote I/O requests that are pending. The pending I/O requests include these requests that were received, for example, prior to the quiesce operation being completed on that node (e.g., as indicated by element 506). However, as noted, any additional shipped I/O received after the quiesce operation being completed on that node will also be issued. Confirmations of this shipped I/O being issued by the storage devices are also directed to the shipping node. Since the local application typically continues to generate I/O requests, these local I/O requests are stored, such as by using a queue. However, in one embodiment, if the new I/O requests are determined to be dependent I/O, as described below, the dependent I/O is processed. Otherwise, if the additional local I/O is not found to be dependent I/O (or the proxy node does not use this technique), these local I/O requests are stored.

In element 514, the control module indicates completion of the drain operation. For example, control module 310(2) can send a message/indication to a supervising control module/manager entity (e.g., control module 310(3) of node 302(3)). In one implementation, e.g., when performing a combined quiesce/drain operation, the control module indicates completion of such quiesce/drain operation.

In element 516, the control module continues to process additional remote I/O requests, according to one embodiment. With reference to FIG. 3, control module 310(2) of proxy node 302(2) continues to receive, and process (e.g., issue to storage device 304(1) and send success confirmations from the storage devices to the shipping node(s)) remote I/O that is shipped from shipping node 302(1). The control module of the proxy node continues to store (e.g., queue) any additional local I/O requests.

Figure 6:
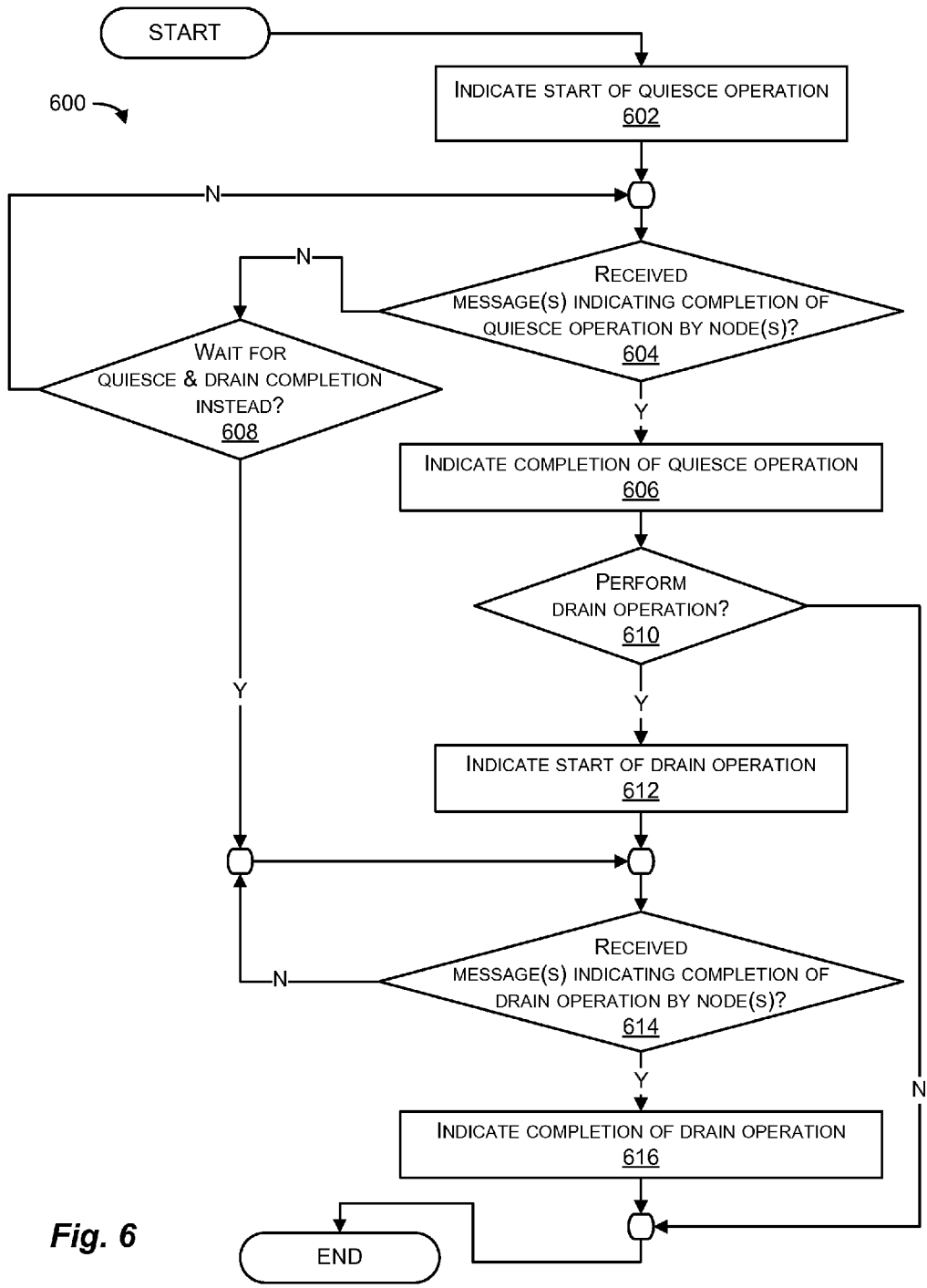
FIG. 6 is a flowchart of a method illustrating operation of a control node of a distributed storage system performing I/O quiesce and drain operations, according to some embodiments.

FIG. 6 is a flowchart of a method 600 illustrating operation of a control node of a distributed storage system performing I/O quiesce and drain operations, according to some embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 600 is described with reference to variations of the elements described in connection with FIGS. 1, 2, and 3. In one embodiment, method 600 is implemented by a control module of a control/supervising node, such as control module 310(3) of node 302(3).

In element 602, the control module indicates start of a quiesce operation, according to one embodiment. It is noted that the control module can send a message that indicates start of both quiesce and drain operations, or just the quiesce operation. This message is sent by the control module of the control (i.e., supervising) node, such as of node 310(3) of FIG. 3. The control node can determine to which nodes of the cluster to send the quiesce start messages.

In element 604, the control module determines whether messages indicating completion of quiesce operation(s) are received, according to one embodiment. The control module can determine whether messages/notifications/confirmations are received from all of the nodes that received messages/indications to start the quiesce operation (of element 602). If the control module determines that all of the messages are received, element 606 is performed. Otherwise, element 604 is performed again.

In element 606, the control module indicates a cluster-wide completion of the quiesce operation, according to one embodiment. With reference to the above examples, the control module of the control/supervisory node determines whether it received messages/confirmations from the selected nodes of the cluster. These selected nodes can be all the nodes in the cluster, or the nodes that the control module of the control/supervising node sent messages/indications of quiesce start.

In element 608, the control node determines whether to wait for indications of both quiesce/drain operations being completed, according to one embodiment. For example, some of the nodes receiving the message/indication of element 602 also automatically perform the drain operation, and do not send messages/indications of the first portion of the drain operation (i.e., the quiesce operation) being completed.

In element 610, the control module determines whether to send a message indicating start of a drain operation, according to one embodiment. If the control module determines to send the drain start message, element 612 is performed. Otherwise, method 600 ends. In element 612, the control module (of the supervisory/control node) indicates start of the drain operation, according to one embodiment. This drain start message/indication can be sent to the same node(s) as in element 602.

In element 614, the control module determines whether messages indicating completion of drain operation(s) are received, according to one embodiment. The control module can determine whether messages/notifications/confirmations are received from all of the nodes that received messages/indications to start the quiesce operation (of element 602) and/or to start the drain operation (of element 612). If the control module determines that all of the messages are received, element 616 is performed. Otherwise, element 614 is performed again.

In element 616, the control module indicates a cluster-wide completion of the drain operation, according to one embodiment. With reference to the above examples, the control module of the control/supervisory node determines whether it received messages/confirmations from the selected nodes of the cluster. These selected nodes can be all the nodes in the cluster, or the nodes that the control module of the control/supervising node sent messages/indications of quiesce/drain start.

Figure 7:
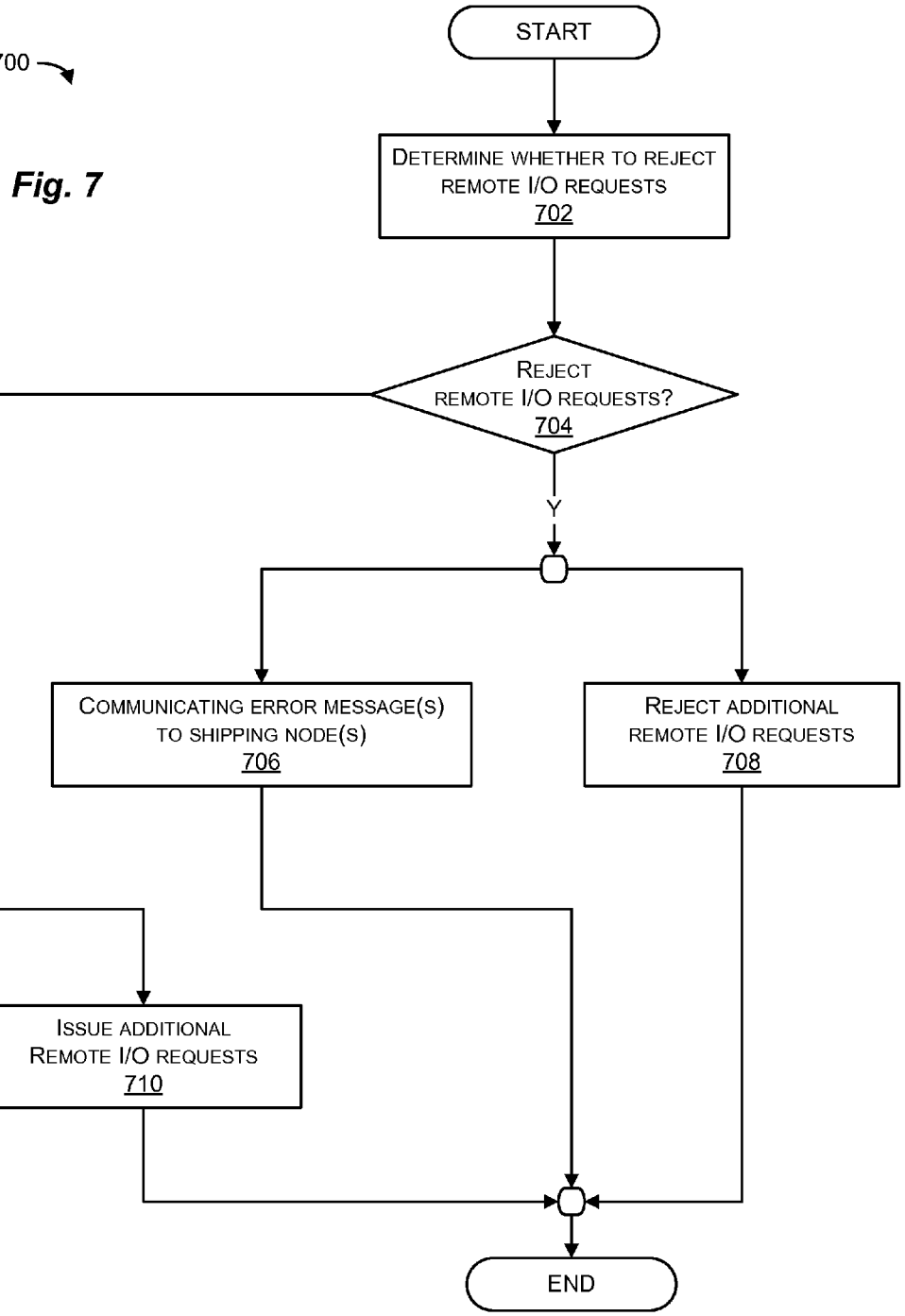
FIG. 7 is a flowchart of a method illustrating operation of a node of a distributed storage system performing I/O quiesce and drain operations, according to some embodiments.

FIG. 7 is a flowchart of a method 700 illustrating operation of a proxy node of a distributed storage system performing I/O quiesce and drain operations, according to some embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 700 is described with reference to variations of the elements described in connection with FIGS. 1, 2, and 3. In one embodiment, method 500 is executed by a control module, such as control module 116 and/or control module 310(1)-310(3). In certain embodiments, method 700 is implemented by a proxy node, such as node 302(2). In certain embodiments, method 700 implements elements 508 and/or 516 of method 500.

In element 702, the control module determines whether to reject remote I/O requests, according to one embodiment. For example, in element 702, the control module decides whether to store and issue the received remote I/O requests (i.e., shipped I/O), or to process them differently.

In element 704, the control module, based on element 702, determines whether to reject remote I/O requests, according to one embodiment. If the control module determines to reject the received I/O requests, elements 706 and 708 are performed. Otherwise, element 710 is performed.

In element 706, the control module (of the proxy node) communicates error message(s) to the shipping nodes, according to one embodiment. In one embodiment, these error messages include a negotiated error. The negotiated error refers to an error condition that the control modules of the nodes in the cluster agree on. As a result, the control modules (e.g., of the shipping nodes that receive the negotiated error message) have predetermined responses/actions to this predetermined error. Such response can include forwarding the additional shipped I/O (that was rejected by the initial proxy node) to another proxy node (as it is possible that quiesce state is not cluster wide and I/O can be shipped to other nodes).

In element 708, the control module (of the proxy node) rejects the additional remote I/O requests, according to one embodiment. In one implementation, control node 310(2) simply ignores any additional remote I/O requests. In another implementation, control node 310(2) (temporarily) stores and forwards any additional remote I/O requests to other node(s), but does not otherwise process/issue these additional remote I/O requests.

In element 710, the control module (of the proxy node) issues the additional remote I/O requests, according to one embodiment. In other words, control node 310(2) continues to receive and process any additional shipped I/O by issuing the shipped I/O to storage device 304(1). Control node 310(2) also continues to receive any confirmations from the storage devices, and communicate these confirmations to the shipping node(s).

Figure 8:
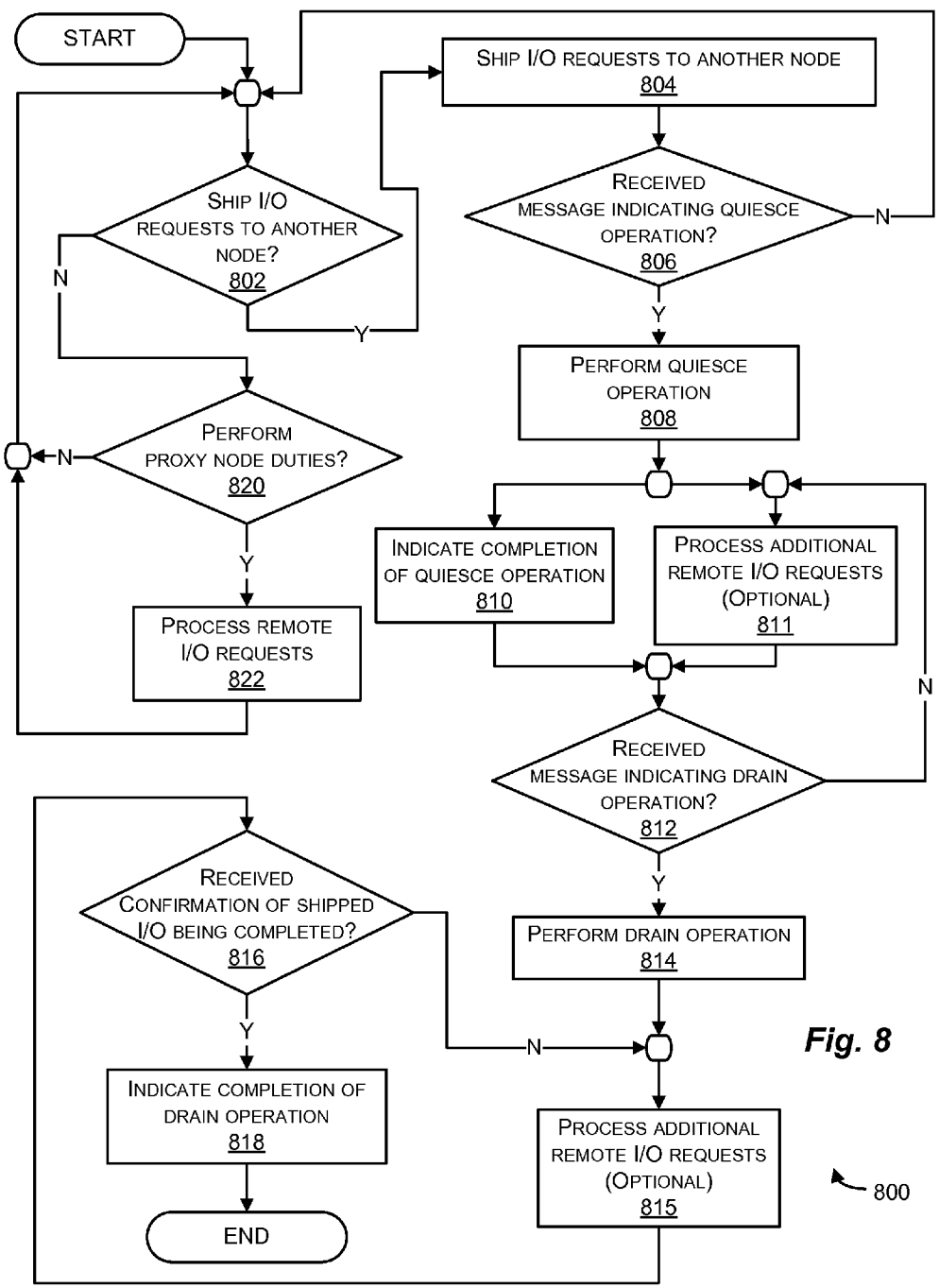
FIG. 8 is a flowchart of a method illustrating operation of a shipping node of a distributed storage system, according to some embodiments.

FIG. 8 is a flowchart of a method 800 illustrating operation of a shipping node of a distributed storage system performing I/O quiesce and drain operations, according to some embodiments. As will be appreciated in light of the present disclosure, this method may be modified in order to derive alternative embodiments. Also, the operations in this embodiment are shown in sequential order. However, certain operations may occur in a different order than shown, certain operations may be performed concurrently, certain operations may be combined with other operations, and certain operations may be absent in another embodiment. Method 800 is described with reference to variations of the elements described in connection with FIGS. 1, 2, and 3. In one embodiment, method 800 is executed by a control module, such as control module 116 and/or control module 310(1)-310(3). In one embodiment, method 800 is implemented by a shipping node, such as node 302(1).

In element 802, the control module (of the shipping node) determines whether to ship I/O to another node (a proxy node), according to one embodiment. If the control module determines to ship the I/O, element 804 is performed. Otherwise, element 820 is performed. In element 804, the control module ships I/O to a proxy node, according to one embodiment.

In element 806, the control module determines whether a message indicating start of a quiesce operation is received, according to one embodiment. It is noted that this message can also indicate a drain operation, i.e., the message indicates both quiesce and drain operations. A supervising control module/manager entity can send these messages to the shipping node. As noted above, another technique to notify control modules of the desired quiesce (and/or drain) can be used in addition to, or instead of, sending messages, such as by issuing notifications, raising interrupts, setting shared register bits, writing quiesce (and/or drain) instructions in shared memory, among others, and unless otherwise indicated, using messages also encompasses these other techniques. If the control module determines that the quiesce message is received, element 808 is performed. Otherwise, the process loops to element 802, which is performed again.

In element 808, the control module starts I/O quiesce operation on the shipping node, according to one embodiment. With reference to FIG. 3, in response to receiving the quiesce message of element 806, control module 310(1) starts the quiesce operation on its associated shipping node 302(1). The quiesce operation includes the shipping node stopping acceptance of any new I/O requests that are locally generated by the local application, e.g., application 320(1). Since the local application typically continues to generate I/O requests, these local I/O requests are stored, such as by using a queue.

In element 810, the control module (of the shipping module) indicates completion of the quiesce operation. For example, control node 310(1) can send a message/indication to a supervising control module/manager entity (e.g., control module 310(3) of node 302(3)). However, in some implementation, the control module of the shipping node can simply internally indicate completion of the quiesce operation. In one example, when performing a queisce/drain operation, the drain portion of the operation is not performed until the quiesce portion of the operation is completed first.

In element 811, the control module (of the shipping module) optionally processes any additional remote I/O requests, according to one embodiment. Element 811 is optionally implemented if the shipping node also performs proxy node duties for other nodes. With reference to FIG. 3, control module 310(1) of shipping node 302(1) continues to receive, and process (i.e., issue to storage device 304(1) and send success confirmations from the storage devices to the other node(s)) remote I/O received from shipping node 302(1).

In element 812, the control module (of the shipping module) determines whether a message indicating start of a drain operation is received, according to one embodiment. It is noted that this drain operation indicating message can be a new message that is received from the supervising module. However, in one implementation, an indication to start the drain operation can be included in the message received in element 804. In other words, the I/O drain operation can be started by the control node receiving drain message(s)/notifications. The I/O drain can also be started by the control module automatically, i.e., in response to the shipping node completing I/O quiesce. If the control module (of the shipping module) determines that the start of drain operation message is received, element 814 is performed. Otherwise, element 811 is performed.

In element 814, the control module performs the drain operation. The drain operation includes the shipping node issuing any local I/O requests that are pending, and waiting for their completion. The pending I/O requests include these requests that were received, for example, prior to the quiesce operation being completed on that node (e.g., as indicated by element 810).

In element 815, the control module (of the shipping module) optionally processes any additional remote I/O requests, according to one embodiment. Element 815 is optionally implemented if the shipping node also performs proxy node duties for other nodes. With reference to FIG. 3, control module 310(1) of shipping node 302(1) continues to receive, and process (i.e., issue to storage device 304(1) and send success confirmations from the storage devices to the other node(s)) remote I/O received from shipping node 302(1).

In element 816, the control module (of the shipping module that is performing the quiesce/drain operation(s)) determines whether confirmations are received from the proxy node that the shipped I/O was completed by the proxy node to the storage devices, according to one embodiment. For example, control module 310(1) waits for acknowledgements from proxy module 310(2) that the shipped I/O was properly issued by proxy node 302(2) to storage device 304(1). If the control module determines that the confirmation(s) are received, element 818 is performed. Otherwise, element 816 (and optionally element 815) is performed again.

In element 818, the control node indicates completion of the drain operation. For example, control node 310(1) can send a message/indication to a supervising control module/manager entity (e.g., control module 310(3) of node 302(3)). In one implementation, e.g., when performing a combined quiesce/drain operation, the control node indicates completion of such quiesce/drain operation.

In element 820, the control node (of the shipping node) determines whether to perform proxy node duties, according to one embodiment. In one embodiment, the shipping node has capability to access the storage devices, but for various reasons (e.g., such as load balancing) ships locally generated I/O requests to another node (as described with reference to element 804). As a result, the shipping node can perform proxy node duties for other node(s), and thus can receive and process remote I/O requests (i.e., as shipped I/O) from other node(s). If the control module determines to perform proxy node duties, element 822 is performed. Otherwise, method 800 ends.

In element 822, the control module (of the shipping node) processes remote I/O requests, according to one embodiment. Processing of remote I/O requests includes issuing the remote I/O to the storage device(s), receiving completion indications from the storage device(s), and forwarding these completion indications to the other nodes (that shipped these remote I/O requests). As a result, the shipping node performs proxy node duties for another node remote I/O by processing and issuing such remote I/O requests.

Pre/Post Notifications

In some embodiments, upon receiving a message to start the quiesce operation, a node can send a quiesce pre-notification message to other nodes in the cluster. This quiesce pre-notification message notifies the recipient nodes that the sender node is starting the quiesce operation. The quiesce pre-notification message can be used to inform to any shipping nodes to choose a different proxy node. The shipping node can then choose a different proxy node without shipping any remote I/O requests to the proxy node that sent this quiesce pre-notification message. This operation is similar to that described by element 706 (which indicates a negotiated error to the shipping nodes), except that the drain pre-notification message is sent prior to the proxy node(s) receiving any additional shipped I/O.

In some embodiments, upon finishing the quiesce operation, a node can send a quiesce post-notification message to other nodes in the cluster. This quiesce post-notification message notifies the recipient nodes that the sender node has completed the quiesce operation. Alternatively, the node can send the quiesce complete message to the control/supervising node, e.g., as described with reference to element 506. In this case, the control/supervising node could collect the quiesce completion information, and notify all nodes when cluster wide quiesce is complete (e.g., as described with reference to element 606).

In some embodiments, before starting the drain operation (but after finishing the quiesce operation), a node can send a drain pre-notification message to other nodes in the cluster. This drain pre-notification message notifies the recipient nodes that the sender node is starting the drain operation.

Similarly, in some embodiments, upon finishing the drain operation, a node can send a drain post-notification message to other nodes in the cluster. This drain post-notification message notifies the recipient nodes that the sender node has completed the drain operation. Alternatively, the node can send the drain complete message to the control/supervising node, e.g., as described with reference to element 514. In this case, the control/supervising node could collect the drain completion information, and notify all nodes when cluster wide drain is complete (e.g., as described with reference to element 616).

Dependent I/O

In some embodiments, the control modules keep track of objects that are associated with various I/O requests. Each I/O request can be associated with a data object, such as with an object that is accessed by the application generating that I/O request. When performing I/O quiesce/drain operations, certain additional I/O requests are not processed, such as when generated by an application local to a proxy node. However, if the additional I/O request is related (also referred to as dependent on) to I/O that has already been issued to the storage device, that additional I/O is also processed (i.e., issued to the storage device). In one implementation, a control module determines whether an additional I/O request that would be blocked (i.e., not received/issued according to the methods described above) is dependent on I/O request that has already been issued. If the additional I/O request is dependent I/O, then this additional I/O request is received/issued (e.g., in elements 504, 512, 808, and/or 814).

Example Systems for Using/Implementing Quiesce and Drain Operations

Figure 9:
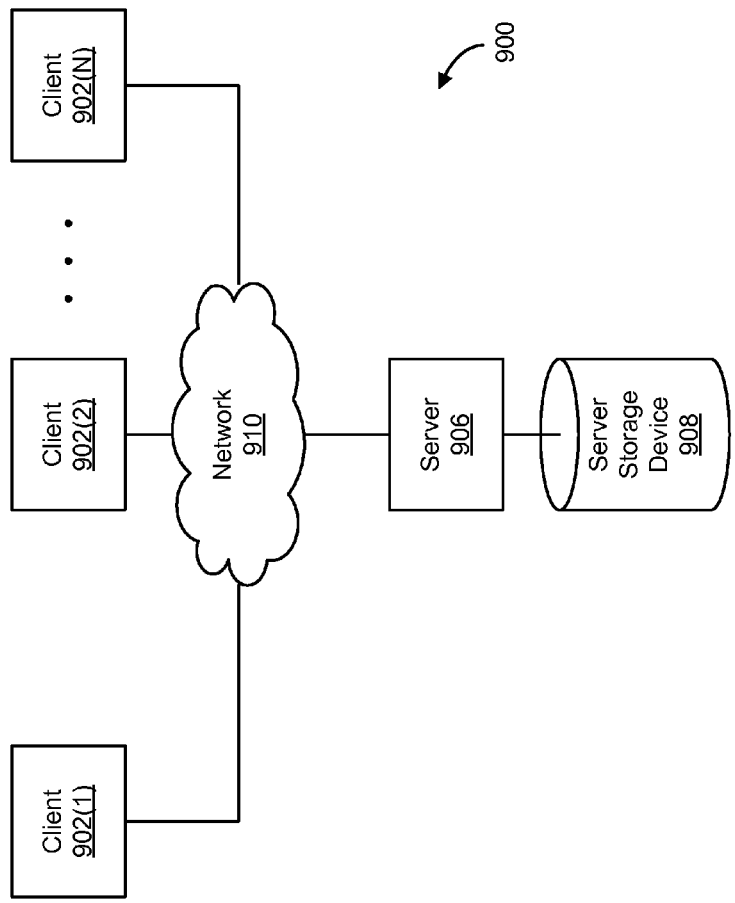
FIG. 9 is a block diagram illustrating a network architecture in which embodiments of the present application can be implemented.

Elements of network architecture can be implemented using different computer systems and networks. An example of one such network environment is described below with reference to FIG. 9. FIG. 9 is a simplified block diagram illustrating a network architecture 900 in which one or more clients are provided with access to a server via various network connections. As depicted in FIG. 9, clients 902(1)-(N) are coupled to a network 910, and so are able to access a server 906 (which can be used to implement node(s) of FIGS. 1, 2, and/or 9A) via network 910. Other servers (not shown) can be used instead to implement node(s) of FIGS. 1, 2, and/or 11A). A client can be implemented using, for example, a desktop computer, a laptop computer, a workstation, a server, a cell phone, a smart phone, a network-enabled personal digital assistant (PDA), or the like. An example of network 910, which can be used by clients 902(1)-(N) to access server 906, is the Internet. Alternatively, access to server 906 can be provided by a local area network (LAN) utilizing Ethernet, IEEE 802.11x, or some other communications protocol. As will be appreciated, server 906 can be accessed by clients coupled directly thereto (not shown).

As also depicted on FIG. 9, server 906 is coupled to a server storage device 908, which includes a data volume such as storage devices 106(1)-106(M), storage devices 114(1)-114(P), and/or storage devices 304(1)-304(2), among others. Server storage device 908 can be implemented as a single storage device or a collection of storage devices. Server storage device 908 can also be implemented as a storage area network, which couples remote storage devices to a server (e.g., server 906), such that the remote storage devices appear as locally-attached storage devices to the server's OS, for example.

In light of the present disclosure, those of skill in the art will appreciate that server storage device 908 can be implemented by any type of computer-readable storage medium, including, but not limited to, internal or external hard disk drives (HDD), optical drives (e.g., CD-R, CD-RW, DVD-R, DVD-RW, and the like), flash memory drives (e.g., USB memory sticks and the like), tape drives and the like. Alternatively, those of skill in the art will also appreciate that, in light of the present disclosure, network architecture 900 can include other components such as routers, firewalls and the like that are not germane to the discussion of the present network and will not be discussed further herein. Those of skill in the art will also appreciate that other configurations are possible. For example, clients 902(1)-(N) can be directly coupled to server storage device 908 without the user of a server or Internet; server 906 can be used to implement both the clients and the server; network architecture 900 can be implemented without the use of clients 902(1)-(N); and so on. As an example implementation of network architecture 900, server 906, services requests to data generated by clients 902(1)-(N) to data stored in server storage device 908. Any of the functionality of the nodes and/or modules can be implemented using one of such clients.

Figure 10:
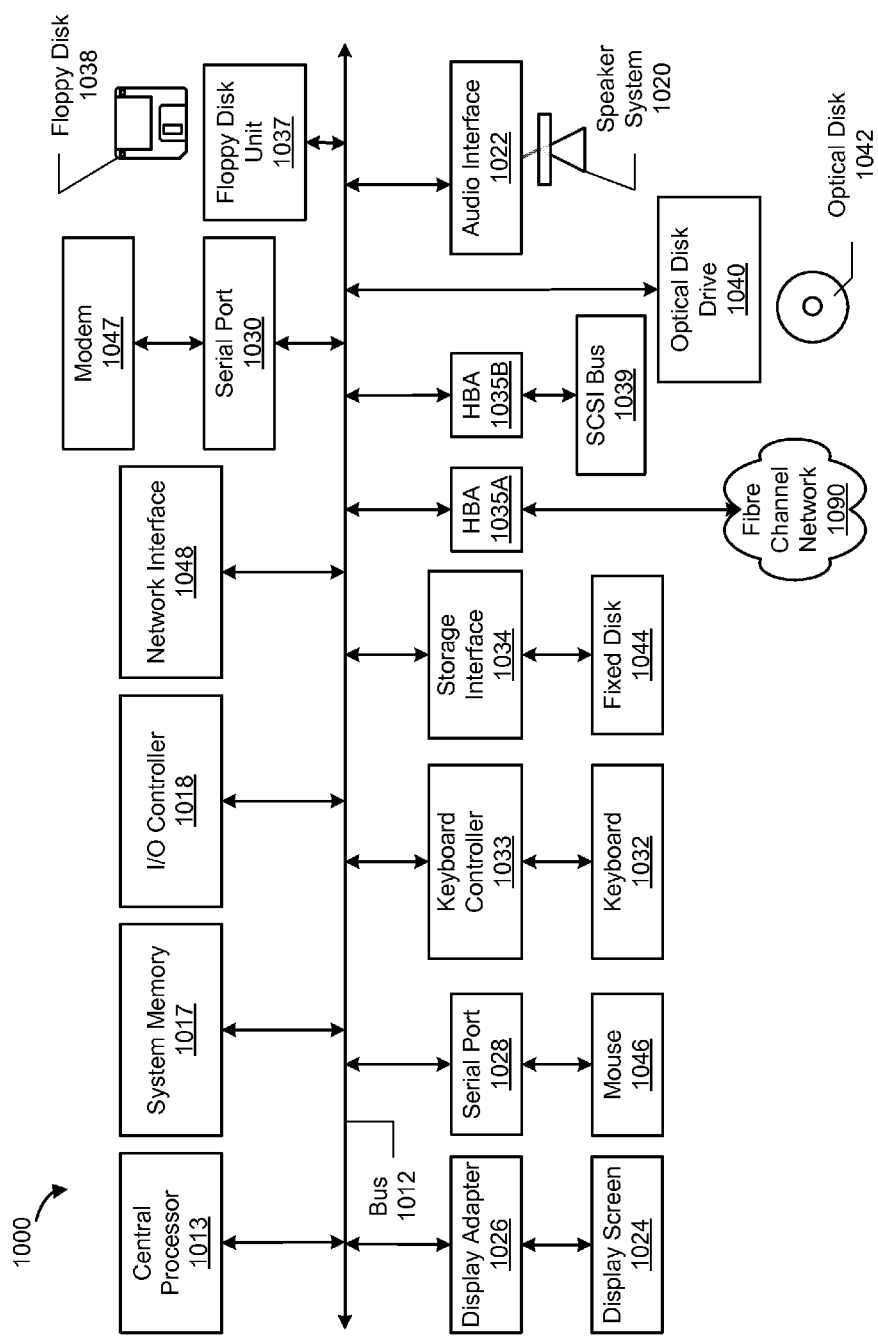
FIG. 10 is a block diagram that illustrates an example of a computer system suitable for implementing embodiments of the present application.

FIG. 10 depicts a block diagram of a computer system 1000 suitable for implementing the present disclosure. Computer system 1000 may be illustrative of various computer systems in the networked system of FIG. 1, such as node(s) and/or coordinator node(s), among others. Computer system 1000 includes a bus 1012 which interconnects major subsystems of computer system 1000, such as a central processor 1013, a system memory 1017 (typically RAM, but which may also include ROM, flash RAM, or the like), an input/output controller 1018, an external audio device, such as a speaker system 1020 via an audio output interface 1022, an external device, such as a display screen 1024 via display adapter 1026, serial ports 1028 and 1030, a keyboard 1032 (interfaced with a keyboard controller 1033), a storage interface 1034, a floppy disk drive 1037 operative to receive a floppy disk 1038, a host bus adapter (HBA) interface card 1035A operative to connect with a Fibre Channel network 1090, a host bus adapter (HBA) interface card 1035B operative to connect to a SCSI bus 1039, and an optical disk drive 1040 operative to receive an optical disk 1042. Also included are a mouse 1046 (or other point-and-click device, coupled to bus 1012 via serial port 1028), a modem 1047 (coupled to bus 1012 via serial port 1030), and a network interface 1048 (coupled directly to bus 1012).

Bus 1012 allows data communication between central processor 1013 and system memory 1017, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 1000 are generally stored on and accessed via a computer readable medium, such as a hard disk drive (e.g., fixed disk 1044), an optical drive (e.g., optical drive 1040), a floppy disk unit 1037, or other storage medium. Additionally, applications can be in the form of electronic signals modulated in accordance with the application and data communication technology when accessed via network modem 1047 or interface 1048.

Storage interface 1034, as with the other storage interfaces of computer system 1000, can connect to a standard computer readable medium for storage and/or retrieval of information, such as a fixed disk drive 1044. Fixed disk drive 1044 may be a part of computer system 1000 or may be separate and accessed through other interface systems. Modem 1047 may provide a direct connection to a remote server via a telephone link or to the Internet via an internet service provider (ISP). Network interface 1048 may provide a direct connection to a remote server via a direct network link to the Internet via a POP (point of presence). Network interface 1048 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 10 need not be present to practice the present disclosure. The devices and subsystems can be interconnected in different ways from that shown in FIG. 10. The operation of a computer system such as that shown in FIG. 10 is readily known in the art and is not discussed in detail in this application. Code for performing Input/Output (I/O) quiesce and drain operations in multi-node distributed storage systems (such as described above with reference to the methods 200, and/or 500-800, as well as functionality described with reference to FIG. 3), etc., to implement the present disclosure can be stored in computer-readable storage media such as one or more of system memory 1017, fixed disk 1044, optical disk 1042, or floppy disk 1038.

Memory 1020 is also used for storing temporary variables or other intermediate information during the execution of instructions by the processor 1013. The operating system provided on computer system 1000 may be MS-DOS®, MS-WINDOWS®, OS/2®, UNIX®, Linux®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
   receiving a message, wherein
      the message indicates a request for an operation to be performed by a first node,
      the operation comprises a quiesce portion and a drain portion,
      a plurality of nodes comprises the first node and a second node,
      the first node is configured to receive one or more first input/output (I/O) requests from a first application,
      the first node is configured to receive one or more second I/O requests from the second node, and
      the first node is configured to issue the one or more first I/O requests and the one or more second I/O requests to one or more storage devices;
   in response to receipt of the message, performing the quiesce portion of the operation on the first node, wherein
      the quiesce portion of the operation comprises preventing the first node from processing additional first I/O requests from the first application, and
      the drain portion of the operation comprises causing the first node to process additional second I/O requests from the second node;
   determining whether the quiesce portion of the operation is completed; and
   in response to determining that the quiesce portion of the operation is completed,
      performing the drain portion of the operation, and
      sending an indication of completion of the drain portion of the operation to a control node, wherein
         the control node is configured to receive indications of completion from each of the plurality of nodes.

2. The method of claim 1, wherein
   the control node is further configured to determine whether indications of completions are received from all of the plurality of nodes, and
   the control node is further configured to, in response to a determination that indications of completions are received from all of the plurality of nodes, indicate a completion of the quiesce portion of a system-wide operation.

3. The method of claim 1, wherein
   the drain portion of the operation comprises the first node communicating the first I/O requests and the second I/O requests to the one or more storage devices, and
   the drain portion of the operation further comprises the first node receiving additional second I/O requests.

4. The method of claim 3, wherein
   the control node is further configured to determine whether indications of completions are received from all of the plurality of nodes, and
   the control node is further configured to, in response to a determination that indications of completions are received from all of the plurality of nodes, indicate a completion of the drain portion of a system-wide operation.

5. The method of claim 3, wherein
   the one or more first I/O requests are generated by the first application,
   the one or more first I/O requests are associated with a first data object,
   the performing the drain portion of the operation further comprises
      determining whether to process a first additional second I/O request of the additional second I/O requests, wherein
         the determining comprises determining whether the first additional second I/O request is associated with the first data object; and
      in response to a determination that the first additional I/O request is associated with the first data object, processing the first additional second I/O request.

6. The method of claim 4, wherein
   the control node is further configured to send an indication of the completion of the drain portion of the system-wide operation to each of the plurality of nodes; and
   each of the plurality of nodes are configured to resume normal operations subsequent to receiving the indication.

7. The method of claim 1, wherein
   the second node is configured to receive the one or more second I/O requests from a second application.

8. The method of claim 1, wherein
   the first node not processing the additional first I/O requests comprises
      the first node receiving the additional first I/O requests,
      the first node storing the additional first I/O requests, and
      the first node not communicating the additional first I/O requests to the one or more storage devices.

9. The method of claim 1, wherein
   the first node processing the additional second I/O requests comprises
      the first node receiving the additional second I/O requests, the first node communicating the additional second I/O requests to the one or more storage devices.

10. The method of claim 1, wherein
the first node processing the additional second I/O requests comprises
the first node not receiving the additional second I/O requests,
the first node communicating an error message to the second node, wherein
the error message indicates to the second node that the first node is not processing the additional second I/O requests.

11. The method of claim 10, wherein
the second node is configured to
in response to receiving the error message, communicating the additional second I/O requests to at least a third node of the plurality of nodes.

12. The method of claim 1, further comprising:
configuring the first node to not process the additional second I/O requests.

13. The method of claim 1,
determining a third node of the plurality of nodes, wherein
the third node of the plurality of nodes is configured to process second I/O requests in response to receiving the message.

14. A system comprising:
one or more processors,
a control module of a first node, wherein
the control module of the first node is configured to
receive a message, wherein
the message indicates a request for an operation to be performed by the first node,
the operation comprises a quiesce portion and a drain portion,
a plurality of nodes comprises the first node and a second node,
the first node is configured to receive one or more first input/output (I/O) requests from a first application,
the first node is configured to receive one or more second I/O requests from the second node, and
the first node is configured to issue the one or more first I/O requests and the second I/O requests to one or more storage devices,
in response to receipt of the message, perform the quiesce portion of the operation on the first node, wherein
the quiesce portion of the operation comprises preventing the first node from processing additional first I/O requests from the first application, and
the drain portion of the operation comprises causing the first node to process additional second I/O requests from the second node;
determine whether the quiesce portion of the operation is completed; and
in response to determining that the quiesce portion of the operation is completed,
perform the drain portion of the operation, and
send an indication of completion of the drain portion of the operation to a control node, wherein
the control node is configured to receive indications of completion from each of the plurality of nodes; and
the control module of the first node is configured to be executed using the one or more processors.

15. The system of claim 14, wherein
the control node is further configured to determine whether indications of completions are received from all of the plurality of nodes, and
the control node is further configured to, in response to a determination that indications of completions are received from all of the plurality of nodes, indicate a completion of the quiesce portion of a system-wide operation.

16. The system of claim 14, wherein
the drain portion of the operation comprises the first node communicating the first I/O requests and the second I/O requests to the one or more storage devices,
the drain portion of the operation further comprises the first node receiving additional second I/O requests.

17. The system of claim 14, wherein
the first node not processing the additional first I/O requests comprises
the first node receiving the additional first I/O requests,
the first node storing the additional first I/O requests, and
the first node not communicating the additional first I/O requests to the one or more storage devices.

18. A computer program product comprising:
a plurality of instructions, comprising
a first set of instructions, executable on a computer system, configured to receive a message, wherein
the message indicates a request for an operation to be performed by a first node,
the operation comprises a quiesce portion and a drain portion;
a plurality of nodes comprises the first node and a second node,
the first node is configured to receive one or more first input/output (I/O) requests from a first application,
the first node is configured to receive one or more second I/O requests from the second node, and
the first node is configured to issue the one or more first I/O requests and the second I/O requests to one or more storage devices,
a second set of instructions, executable on the computer system, configured to perform the quiesce portion of the operation on the first node, in response to receipt of the message, wherein
the quiesce portion of the operation comprises preventing the first node from processing additional first I/O requests from the first application, and
the drain portion of the operation further comprises causing the first node to process additional second I/O requests from the second node,
a third set of instructions, executable on the computer system, configured to determine whether the quiesce portion of the operation is completed, and
a fourth set of instructions, executable of the computer system, configured to perform the drain portion of the operation in response to determining that the quiesce portion of the operation is completed, and
send an indication of completion of the drain portion of the operation to a control node, wherein
the control node is configured to receive indications of completion from each of the plurality of nodes; and
a non-transitory computer-readable storage medium, wherein the instructions are encoded in the non-transitory computer-readable storage medium.

19. The computer program product of claim 18, wherein
the control node is further configured to determine whether indications of completions are received from all of the plurality of nodes, and
the control node is further configured to, in response to a determination that indications of completions are received from all of the plurality of nodes, indicate a completion of the quiesce portion of a system-wide operation.

20. The computer program product of claim 18, wherein
the drain portion of the operation comprises the first node communicating the first I/O requests and the second I/O requests to the one or more storage devices, and
the drain portion of the operation further comprises the first node receiving additional second I/O requests.

21. The computer program product of claim 18, wherein
the first node not processing the additional first I/O requests comprises
the first node receiving the additional first I/O requests,
the first node storing the additional first I/O requests, and
the first node not communicating the additional first I/O requests to the one or more storage devices.

* * * * *